United States Patent [19]

Schuppert, Jr.

[11] Patent Number: 5,230,639
[45] Date of Patent: Jul. 27, 1993

[54] TOP ACTIVATED EYELET AND TOOL FOR USE THEREWITH

[75] Inventor: Leo V. Schuppert, Jr., York, Pa.

[73] Assignee: AMP Incorporated, Harrisburg, Pa.

[21] Appl. No.: 897,684

[22] Filed: Jun. 12, 1992

[51] Int. Cl.$^5$ ............................................. H01R 13/73
[52] U.S. Cl. ...................... 439/572; 29/739; 439/82
[58] Field of Search ................. 439/82, 571, 572, 573; 29/739; 411/15, 501, 504, 506, 505; 227/55, 62

[56] References Cited

U.S. PATENT DOCUMENTS 4,715,112 12/1987 Jackson et al. .................. 29/739
4,884,336 12/1989 Waters et al. ................... 29/739 X

*Primary Examiner*—Eugene F. Desmond

[57] ABSTRACT

An eyelet (64) for securing a first member (22) to a second member (12) through aligned apertures (28,30) includes a tubular shank portion (66), an inverted portion (68) at a first end of the shank portion and a generally cup-shaped portion (70) at a second end of the shank portion remote from the first end. The cup-shaped portion (70) remains outside the apertures (28,30) when the eyelet (64) is inserted therethrough and has its sidewall (76) formed with an interference portion. A tool (94) for use with the eyelet includes a plunger (82) surrounded by and slidably received in a collet (84) which is longitudinally divided into a plurality of segments. At the end of each of the collet segments there is a grip head (96) having an outer surface shaped complemental to the inner surface of the sidewall (76) of the cup-shaped portion of the eyelet. A first camming surface (98) on the plunger and a second camming surface (100) on the interior of each of the collet segments are arranged so that as the plunger is extended out of the collet the collet is radially expanded. Thus, the grip heads engage the inner surface of the sidewall of the cup-shaped portion of the eyelet and cooperate with the interference portion of the sidewall so that the eyelet is gripped by the tool both radially and longitudinally.

7 Claims, 4 Drawing Sheets

TOP ACTIVATED EYELET AND TOOL FOR USE THEREWITH

BACKGROUND OF THE INVENTION

This invention relates to top activated eyelets, or rivets, which may be utilized to secure electrical connectors to printed circuit boards and, more particularly, to an improved eyelet and an improved tool for gripping and activating the eyelet.

U.S. Pat. No. 4,717,219 discloses an eyelet for assembling an electrical connector to a printed circuit board. The electrical connector is formed with a mounting flange having an aperture therethrough. The aperture through the flange is adapted to be in registration with a corresponding aperture through the printed circuit board, with an eyelet of the disclosed design extending through both apertures. The eyelet has a flange engaging the mounting flange of the electrical connector, an inverted conical end remote from the flange and a generally tubular shank extending therebetween. The inverted conical end of the eyelet is splayed, or expanded, into contact with the lower surface of the printed circuit board by activation through the bore of the tubular shank to secure the electrical connector to the printed circuit board.

The eyelet disclosed in the '219 patent is preferably utilized in conjunction with a robotic tool which splays the inverted conical end of the eyelet. It is typically a requirement that when splaying the inverted conical end, no forces be applied to the robot arm, the electrical connector or the printed circuit board. All such forces are to be contained within the eyelet. U.S. Pat. No. 4,750,261 discloses a robotic tool for gripping and activating the eyelet so that this requirement is met. The disclosed tool includes a plunger insertable into the tubular shank of the eyelet for engagement with the inverted conical end to splay the inverted conical end. A split collet surrounds the plunger and is formed with grip heads at its end. The collet extends into the tubular shank of the eyelet and, when the plunger is extended to engage the inverted conical end of the eyelet, the collet is expanded so that the grip heads, which have exterior barbs, engage against and tightly grip the internal surface of the eyelet within its tubular shank.

In the arrangement disclosed in the '219 patent, the aperture through the mounting flange of the electrical connector is formed with spaced longitudinal protrusions, or ribs. Therefore, the tubular shank of the eyelet is free to expand within the aperture between the protrusions and only a relatively low force is required to be exerted by the grip heads to grip the eyelet. The '219 patent also discloses a grounding strap which extends on the undersurface of the electrical connector mounting flange around the aperture. An additional function of the eyelet is to provide an electrical ground connection between the electrical connector and the printed circuit board. The eyelet is therefore formed of a conductive metal. It has been found that in order to ensure a good electrical connection from the grounding strap to the eyelet, an additional open eyelet is preferably inserted into the mounting flange aperture from the bottom. This additional eyelet has a lower flange which engages the grounding strap, and when the eyelet of the '219 patent is inserted with a press fit into the mounting flange aperture through the additional eyelet, a secure electrical connection between the '219 eyelet and the grounding strap is effected. However, when using the additional eyelet, this eliminates the room for expansion of the tubular shank of the '219 eyelet between the longitudinal protrusions of the aperture. This increases the force required to grip the inside of the tubular shank of the eyelet.

It is therefore an object of the present invention to provide an improved eyelet of the type described, and a tool for use therewith, wherein only a relatively small force is required to grip the eyelet.

SUMMARY OF THE INVENTION

The foregoing and additional objects are attained in accordance with the principles of this invention by providing an eyelet for securing a first member to a second member. The first and second members each have generally parallel and planar spaced apart surfaces and each is formed with a respective aperture extending between its respective surfaces. The apertures are adapted to be in registration with each other when the first member is secured to the second member and the eyelet is adapted to extend through both the apertures. The eyelet comprises a generally tubular shank portion having a longitudinal bore, the shank portion being of a length which is greater than the sum of the spacings between the surfaces of the first and second members. An inverted portion is provided at a first end of the shank portion, the inverted portion extending inwardly from the first end and being engageable through the shank portion bore. The eyelet further comprises a generally cup-shaped portion at a second end of the shank portion remote from the first end, the cup-shaped portion having a generally flat bottom extending outwardly from the shank portion and sized to rest on a surface of the first member when the shank portion of the eyelet is contained within the first member aperture. The cup-shaped portion also has a generally tubular sidewall which extends from the outer periphery of the bottom away from the shank portion and terminates in an edge, the sidewall being formed with an interference portion spaced from the bottom which extends inwardly relative to the outer periphery of the bottom.

In accordance with an aspect of this invention, there is provided a tool for use with the aforedescribed eyelet. The tool comprises a plunger adapted to extend into the bore of the eyelet shank portion and engage against the inverted portion of the eyelet. The tool further comprises a collet surrounding and slidably receiving the plunger, with the collet being longitudinally divided into a plurality of collet segments. The tool also comprises a plurality of grip heads, each of the grip heads being secured to the end of a respective one of the collet segments, and each of the grip heads having an outer surface shaped complemental to the inner surface of the sidewall of the cup-shaped portion of the eyelet. A first camming surface is formed on the plunger and a second camming surface is formed on the interior of each of the collet segments. The first and second camming surfaces are arranged so that as the plunger is extended out of the collet, the first camming surface engages the second camming surface to radially expand the collet. Therefore, when the grip heads are within the cup-shaped portion of the eyelet and the plunger is extended out of the collet, the grip heads engage the inner surface of the sidewall of the cup-shaped portion and cooperate with the interference portion of the sidewall so that the eyelet is gripped by the tool both radially and longitudinally.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
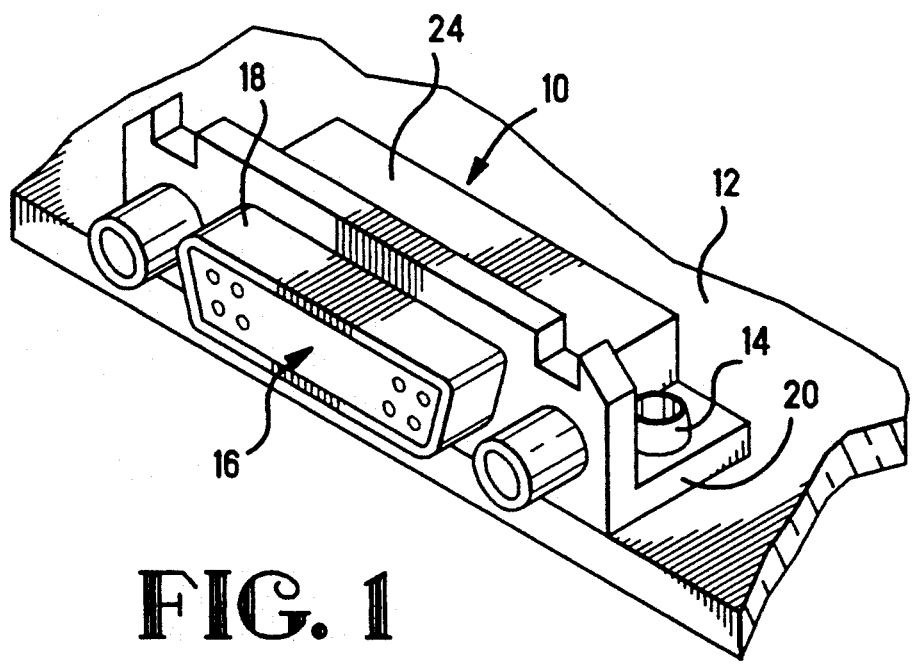
FIG. 1 an electrical connector and printed circuit board secured together by an eyelet according to this invention.
Figure 2:
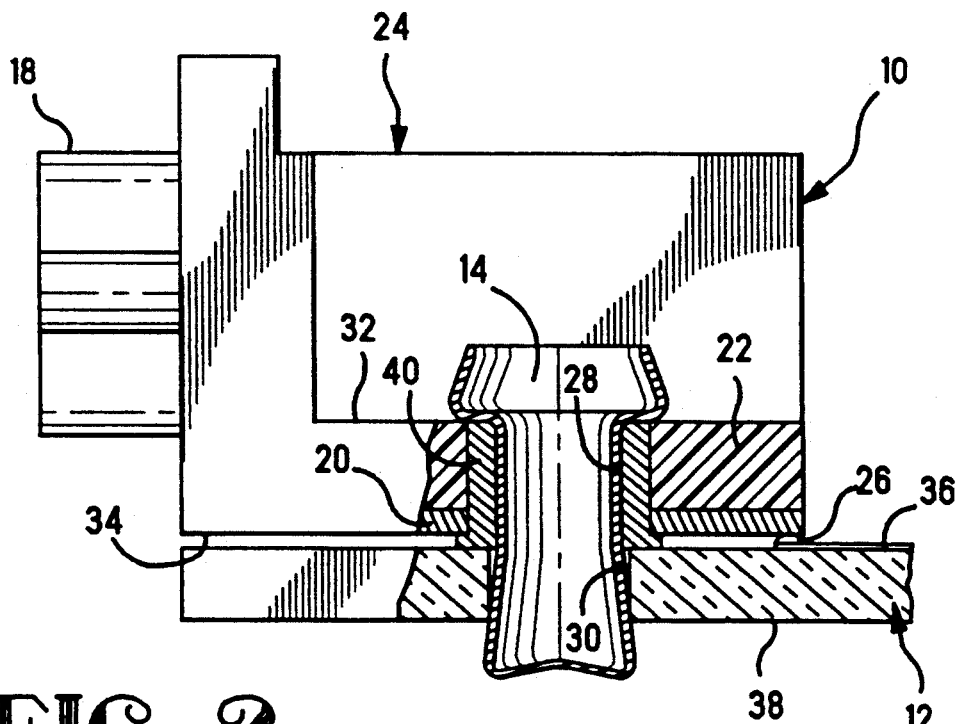
FIG. 2 is a partial cross sectional view showing the electrical connector in a pre-assembly stage with an eyelet extending through apertures in the connector mounting flange and the printed circuit board.

Referring now to the drawings, FIGS. 1 and 2 illustrate an electrical connector 10 secured to a printed circuit board 12 by means of a plurality of eyelets 14 according to this invention. Illustratively, the connector 10 is a D-connector having a "D" section 16 surrounded by a shield 18. The shield 18 has straps 20 which extend along bottom surfaces of the mounting flange 22 of the housing 24 of the connector 10. The straps 20 typically serve as ground straps and are to be connected to conductive paths 26 on the printed circuit board 12. In the pre-completion stage, the paths 26 may have a solder paste thereon before reflow soldering of the solder paste. The eyelet 14 secures the connector housing 24 to the printed circuit board 12 prior to the soldering operation.

As shown in FIG. 2, the eyelet 14 extends through an aperture 28 in the mounting flange 22 and through an aperture 30 in the printed circuit board 12, the apertures 28 and 30 being in registration for assembly of the connector 10 to the board 12. The flange 22 has generally parallel and planar spaced apart surfaces 32 and 34, and the aperture 28 extends between the surfaces 32 and 34. Similarly, the printed circuit board 12 has generally parallel and planar spaced apart surfaces 36 and 38, and the aperture 30 extend between the surfaces 36 and 38.

As previously discussed, in order to ensure a good electrical connection between the grounding strap 20 and the eyelet 14, an additional eyelet 40 is inserted into the aperture 28 from the bottom thereof. The additional eyelet 40 is formed as a simple cylindrical sleeve with a flange at one end, and is inserted into the aperture 28 from the lower surface 34 of the mounting flange 22 so that the flange of the additional eyelet 40 is in electrical contact with the grounding strap 20.

Figure 3:
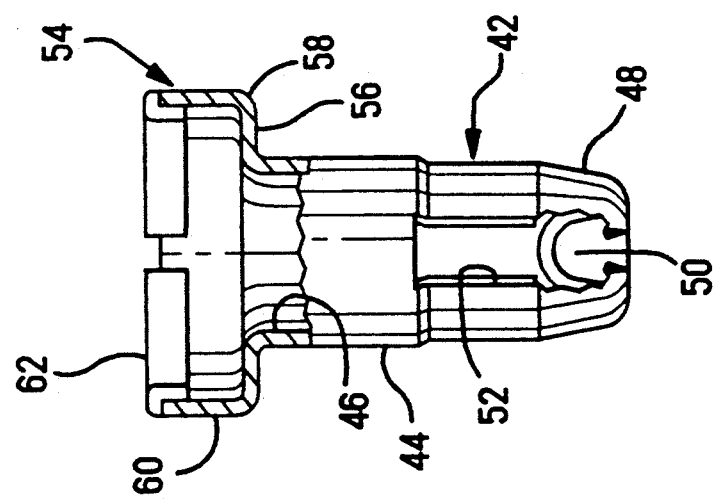
FIG. 3 is a partial cross sectional view of a first embodiment of an eyelet constructed according to this invention.

FIG. 3 illustrates a first embodiment of a top activated eyelet which may be securely gripped to retain all forces within the eyelet and which does not require the use of excessive force for the gripping function, since gripping takes place away from where the additional eyelet 40 surrounds the shank of the eyelet according to this invention. Thus, as shown in FIG. 3, the eyelet 42 includes a generally tubular shank portion 44 having a longitudinal bore 46, the length of the shank portion 44 being greater than the sum of the spacings between the surfaces 32 and 34 of the flange 22 and the surfaces 36 and 38 of the board 12. Thus, as is clear from FIG. 2, when the eyelet 42 is inserted through the apertures 28 and 30, a first end 48 extends beyond the lower surface 38 of the board 12.

The first end 48 is formed with an inverted portion 50 which contains an excess amount of metal which is displaceable by splaying the first end 48 outwardly, as taught by the '219 patent. To assist in this metal deformation, the shank portion 44 is formed with slots 52 extending to the first end 48. Illustratively, there are three equally spaced slots 52 about the circumference of the eyelet 42.

According to this invention, at the end of the shank portion 44 remote from the first end 48, the eyelet 42 is formed with a generally cup-shaped portion 54. The cup-shaped portion 54 includes a generally flat bottom 56 which extends outwardly from the shank portion 44. The shank portion 44 is preferably cylindrical with a major longitudinal axis and the bottom 56 lies in a plane orthogonal to that axis. Preferably, the outer periphery 58 of the bottom 56 is circular and concentric with the shank portion 44. Since the shank portion 44 is sized to be press fit within the additional eyelet 40, the bottom 56 rests on the surface 32 of the mounting flange 22 when the eyelet 42 is installed.

The cup-shaped portion 54 includes a generally tubular sidewall 60 extending from the outer periphery 58 of the bottom 56 away from the shank portion 44 and terminating in an edge 62. The sidewall 60 is formed with an interference portion spaced from the bottom 56. The interference portion extends inwardly relative to the outer periphery 58 of the bottom 56. In the embodiment shown in FIG. 3, the edge 62 is rolled inwardly to form the interference portion. The function of the interference portion will become clear when the tool for use with the eyelet 42 is discussed hereinafter.

Figure 4:
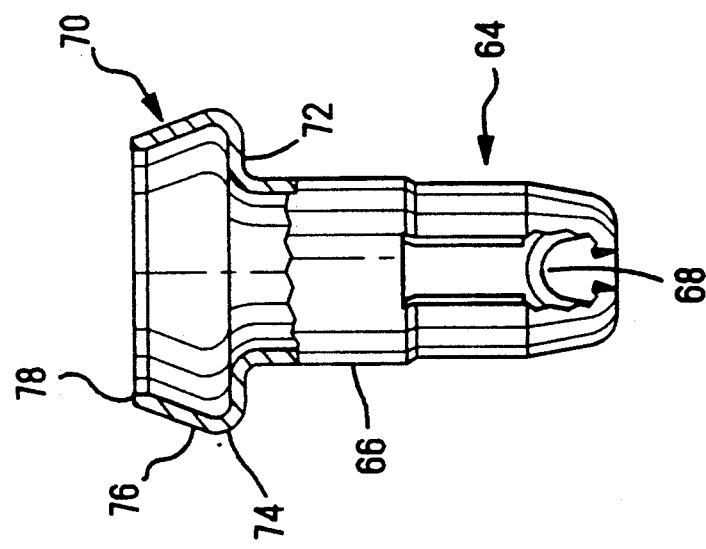
FIG. 4 is a partial cross sectional view of a second embodiment of an eyelet constructed according to this invention.

FIG. 4 discloses a second embodiment of an eyelet according to this invention. As shown in FIG. 4, the eyelet 64 includes a tubular shank portion 66 and an inverted portion 68 at a first end of the shank portion 66, which illustratively are the same as the respective portions of the eyelet 42 (FIG. 3). However, the cup-shaped portion 70 of the eyelet 64 is shaped differently from that of the eyelet 42. Specifically, the cup-shaped portion 70 includes a generally flat bottom 72 extending outwardly from the shank portion 66 to an outer periphery 74 which is circular and concentric with the shank portion 66. The sidewall 76 extends from the outer periphery 74 of the bottom 72 away from the shank portion 66 and terminates in an edge 78. The sidewall 76 tapers inwardly from where it joins the periphery 74 of the bottom 72 so that the inward taper forms the interference portion of the cup-shaped portion 70. Preferably, the sidewall 76 is formed generally as a frustum of a cone tapering inwardly from where it joins the bottom 72 so that the edge 78 is circular, concentric with the shank portion 66 and lies in a plane parallel to the bottom 72.

Figure 5:
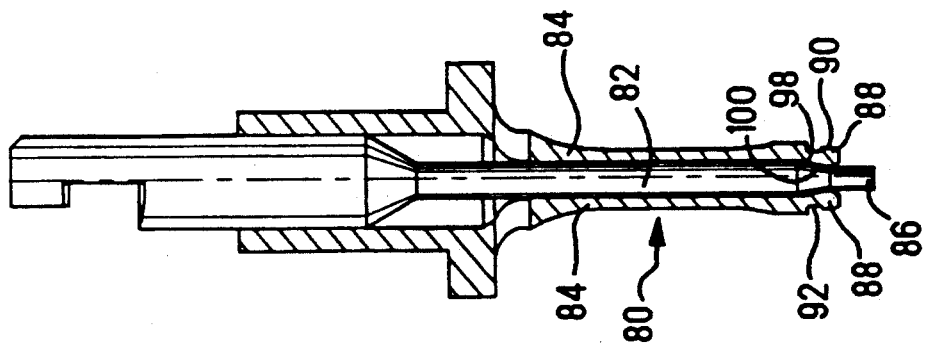
FIG. 5 illustrates a tool for use with the eyelet shown in FIG. 3.

FIG. 5 illustrates a tool 80 for use with the first embodiment of the eyelet 42 shown in FIG. 3. The tool 80 is adapted for use with the apparatus disclosed in the '261 patent and includes a longitudinally moveable plunger 82. Surrounding and slidably receiving the plunger 82 is a collet 84 which is longitudinally divided into a plurality of collet segments, illustratively two in number. The plunger 82 has an activating head 86 at its distal end which extends beyond the collet 84. At the distal end of each of the collet segments there is a grip head 88, each of which has an outer surface which is shaped complemental to the inner surface of the sidewall 60 of the cup-shaped portion 54 of the eyelet 42. Thus, for use with the eyelet 42 shown in FIG. 3, each of the grip heads 88 has an outer surface which has a first portion 90 which is generally cylindrical to mate with the sidewall 60 and a second surface portion 92 which is generally notched to mate with the rolled edge 62.

Figure 6:
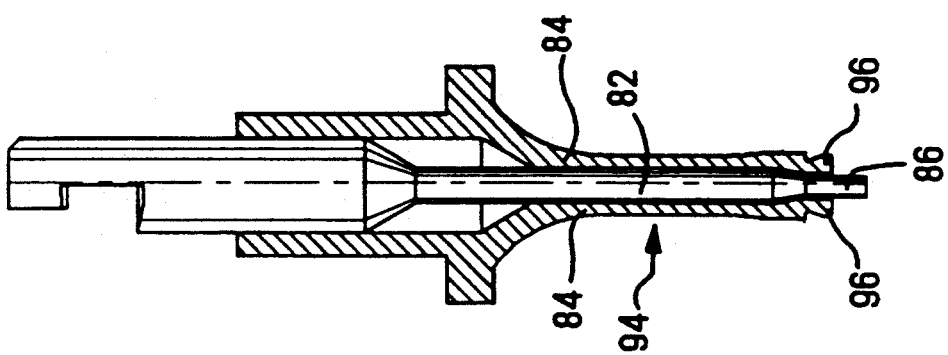
FIG. 6 illustrates a tool for use with the eyelet shown in FIG. 4.

The tool 94 shown in FIG. 6 is designated for use with the second embodiment eyelet 64 shown in FIG. 4. The tool 94 is similar to the tool 80 (FIG. 5) with the exception of the shape of the grip heads 96. The grip heads 96 have an outer surface shaped complemental to the sidewall 76 and are therefore frusto-conical segments.

Figure 7:
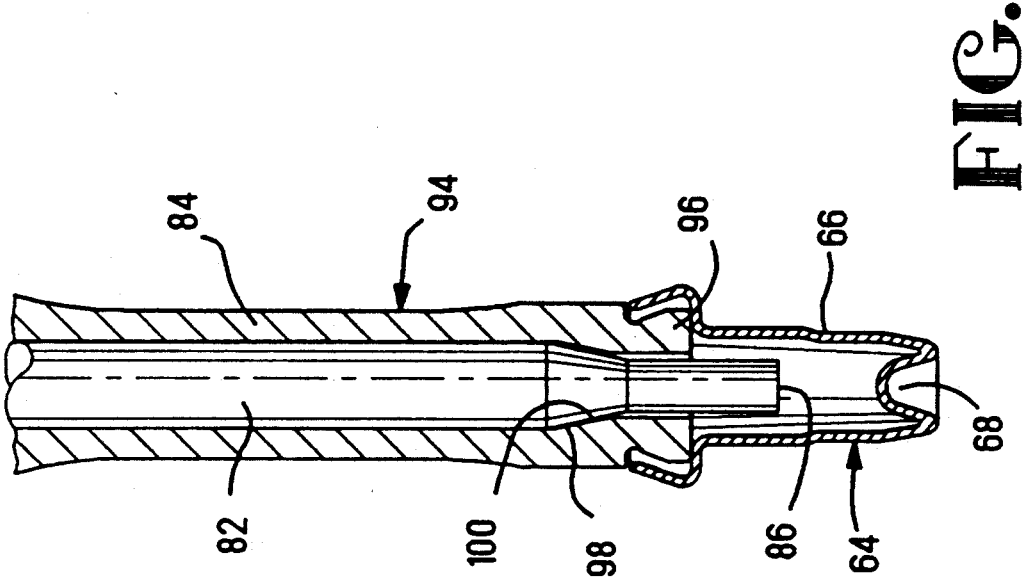
FIG. 7 illustrates the eyelet shown in FIG. 3 with the tool shown in FIG. 5 initially inserted therein.
Figure 9:
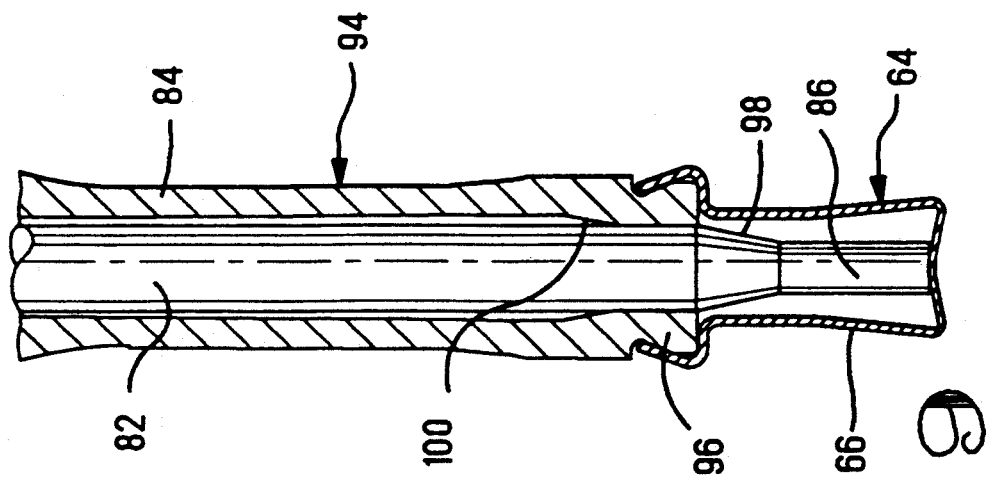
FIG. 9 illustrates the plunger fully extended into the eyelet, an inverted portion of the eyelet being depressed and a shank portion of the eyelet being expanded outwardly.
Figure 8:
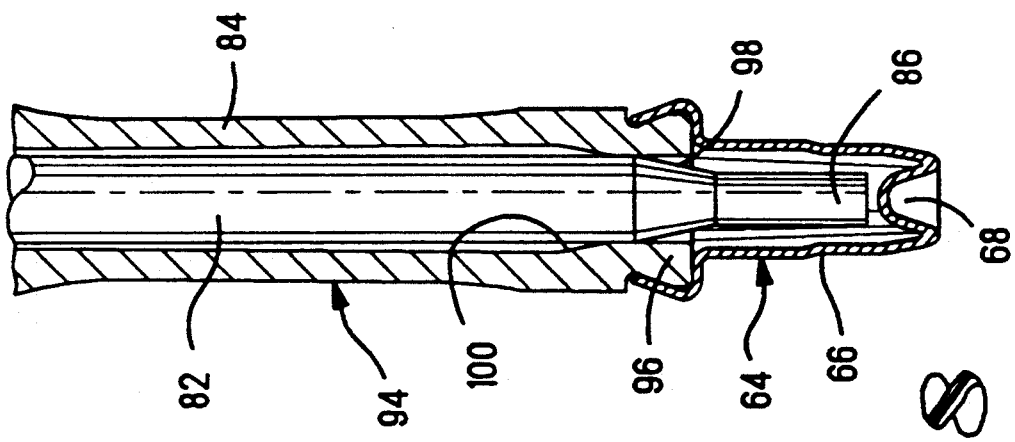
FIG. 8 is a view similar to FIG. 7 showing the plunger partially extended so that the eyelet is gripped.

As shown in FIG. 7, when the tool 94 is inserted in the eyelet 64, the grip heads 96 bottom out against the bottom 72 of the cup-shaped portion 70, while the activating head 86 extends into the bore of the tubular shank portion 66. At this point, there is no gripping of the eyelet 64 by the tool 94. To effect such gripping, the plunger 82 is formed with a first camming surface 98 and the collet 84 is formed with a second camming surface 100 on the interior of each of its segments. Prior to the plunger 82 being extended, the camming surfaces 98, 100 nest against each other, as shown in FIGS. 5, 6, and 7. However, as the plunger 82 is extended out of the collet 84, the first camming surface 98 engages the second camming surface 100 to radially expand the collet 84. As shown in FIG. 8, radial expansion of the collet 84 causes the grip heads 96 to engage the inner surface of the sidewall 76 of the cup-shaped portion 70 of the eyelet 64 and cooperate with the interference portion (i.e., the tapering sidewall 76) so that the eyelet 64 is gripped by the tool 94 both radially and longitudinally. As the plunger 82 is extended further, the end of the activating head 86 engages the inverted portion 68 of the eyelet 64, deforming it outwardly so that the tubular shank portion 66 expands outwardly, as best seen in FIG. 9. The expanded shank portion 66 grips the edges of the aperture 30 thereby securing the connector 10 to the printed circuit board 12.

Accordingly, there has been disclosed an improved top activated eyelet and a tool for use therewith. While exemplary embodiments have been disclosed herein, it will be appreciated by those skilled in the art that various modifications and adaptations to the disclosed embodiments may be made and it is only intended that this invention be limited by the scope of the appended claims.

I claim:

1. An eyelet (42) for securing a first member (22) to a second member (12), said first and second members each having generally parallel and planar spaced apart surfaces (32, 34, 36, 38) and each having a respective aperture (28, 30) extending between its respective surfaces, the apertures adapted to be in registration with each other when said first member is secured to said second member, said eyelet adapted to extend through said apertures adapted to be in registration with each other when said first member is secured to said second member, said eyelet adapted to extend through said apertures and comprising:

a generally tubular shank portion (44) having a longitudinal bore (46), said shank portion having a length which is greater than the sum of the spacings between the surfaces of said first and second members;

an inverted portion (50) at a first end (48) of said shank portion, said inverted portion extending inwardly from said first end and engageable through said shank portion bore; and a generally cup-shaped portion (54, 70) at a second end of said shank portion remote from said first end, said cup-shaped portion having a generally flat bottom (56, 72) extending outwardly from said shank portion and sized to rest on a surface (32) of said first member when said shank portion of said eyelet is contained within said first member aperture, said cup-shaped portion also having a generally tubular sidewall (60, 76) extending from the outer periphery (58, 74) of said bottom away from said shank portion and terminating in an edge (62, 78), said sidewall defining an interference portion spaced from said bottom which extends inwardly relative to the outer periphery of said bottom.

2. The eyelet according to claim 1 wherein said interference portion is defined by said sidewall (76) tapering inwardly from the outer periphery (74) of said bottom.

3. The eyelet according to claim 1 wherein said interference is defined by said sidewall edge (62) being rolled inwardly.

4. The eyelet according to claim 1 wherein said shank portion has slots (52) therein forming segments.

5. The eyelet according to claim 1 wherein said shank portion is cylindrical having a major longitudinal axis, said bottom of said cup-shaped portion lies in a plane orthogonal to said axis, the outer periphery of said bottom is circular and concentric with said shank portion, and said sidewall edge is circular, concentric with said shank portion and lies in a plane parallel to said bottom.

6. The eyelet according to claim 5 wherein said sidewall defined a frustum of a cone tapering inwardly from the outer periphery of said bottom to said sidewall edge.

7. The eyelet according to claim 1 and a tool (80) for use therewith, the tool comprising:

a plunger (82) adapted to extend into the bore of the eyelet shank portion and engage against the inverted portion of the eyelet;

a collet (84) surrounding and slidably receiving said plunger, said collet being longitudinally divided into a plurality of collet segments;

a plurality of grips heads (88, 96), each of said grip heads being secured to the end of a respective one of said collet segments, each of said grip heads having an outer surface (90, 92) shaped complemental to the inner surface of said eyelet cup-shaped portion sidewall;

a first camming surface (98) on said plunger; and a second camming surface (100) on the interior of each of said collet segments;

said first and second camming surfaces being arranged so that as said plunger is extended out of said collet, said first camming surface engages said second camming surface to radially expand said collet;

whereby when said grip heads are within the cup-shaped portion of said eyelet and said plunger is extended out of said collet, said grip heads engage the inner surface of the sidewall of the cup-shaped portion and cooperate with the interference portion of the sidewall so that the eyelet is gripped by the tool both radially and longitudinally.

* * * * *